(12) United States Patent
Ahn et al.

(10) Patent No.: US 10,095,303 B2
(45) Date of Patent: Oct. 9, 2018

(54) NON-VOLATILE MEMORY SYSTEM, MEMORY CARD HAVING THE SAME, AND OPERATING METHOD OF NON-VOLATILE MEMORY SYSTEM

(71) Applicant: SAMSUNG ELECTRONICS CO., LTD., Suwon-si, Gyeonggi-Do (KR)

(72) Inventors: Seok-Won Ahn, Suwon-si (KR); Hwa-Seok Oh, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/685,340

(22) Filed: Apr. 13, 2015

(65) Prior Publication Data

US 2015/0301589 A1    Oct. 22, 2015

(30) Foreign Application Priority Data

Apr. 21, 2014  (KR) .................. 10-2014-0047600

(51) Int. Cl.
*G06F 1/32*      (2006.01)
*G06F 12/02*   (2006.01)

(52) U.S. Cl.
CPC ........ *G06F 1/3275* (2013.01); *G06F 12/0246* (2013.01); *G06F 2212/1028* (2013.01); *G06F 2212/401* (2013.01); *Y02B 60/1225* (2013.01); *Y02B 60/1228* (2013.01); *Y02B 60/32* (2013.01); *Y02D 10/13* (2018.01); *Y02D 10/14* (2018.01); *Y02D 50/20* (2018.01)

(58) Field of Classification Search
CPC .............. G06F 1/3287; G06F 1/3275; G06F 2212/7207; G06F 12/0246; G06F 1/3268; G06F 2212/401; G06F 2212/1028; G06F 13/16; G11C 7/1072; Y02B 60/32; Y02B 60/1225; Y02B 60/1228
See application file for complete search history.

(56) References Cited

U.S. PATENT DOCUMENTS

| | | | |
|---|---|---|---|
| 6,421,776 B1 * | 7/2002 | Hillis ............... | G06F 9/4401 713/2 |
| 6,801,996 B2 | 10/2004 | Banno et al. | |
| 7,917,733 B2 | 3/2011 | Kazuma | |
| 8,347,130 B2 | 1/2013 | Park | |
| 8,386,823 B2 | 2/2013 | Kumar et al. | |
| 2008/0320203 A1 | 12/2008 | Fitzgerald | |
| 2012/0023387 A1 | 1/2012 | Wang et al. | |

(Continued)

OTHER PUBLICATIONS

Haris Lekatsas, et al., "Code Compression for Low Power Embedded System Design," DAC 2000, Los Angeles, California, ACM, pp. 294-299.

(Continued)

*Primary Examiner* — Daniel Tsui
*Assistant Examiner* — Zubair Ahmed
(74) *Attorney, Agent, or Firm* — F. Chau & Associates, LLC

(57) ABSTRACT

A non-volatile memory system includes a memory controller, where the memory controller includes a first region including a first memory that stores compressed code, and a second region including a second memory that stores decompressed code. Power supplied to the first region and the second region is controlled according to an operation mode of the non-volatile memory system.

17 Claims, 11 Drawing Sheets

(56) References Cited

U.S. PATENT DOCUMENTS

| | | | |
|---|---|---|---|
| 2012/0068539 A1 | 3/2012 | Shiotani | |
| 2012/0110307 A1 | 5/2012 | Tsuji | |
| 2012/0239921 A1 | 9/2012 | Fallon | |
| 2012/0284480 A1* | 11/2012 | Williams | H01L 27/105 711/170 |
| 2013/0073886 A1 | 3/2013 | Zaarur | |
| 2013/0124896 A1 | 5/2013 | Park | |
| 2014/0310552 A1* | 10/2014 | So | G06F 1/3275 713/324 |
| 2016/0062691 A1* | 3/2016 | Chang | G11C 11/4072 713/320 |

OTHER PUBLICATIONS

Majid Sarrafzadeh, et al., "Low Power Light-Weight Embedded Systems," ISLPED 2006, Oct. 4-6, 2006, ACM, pp. 1-6.
ECE260B—CSE241A, Winter 2010 "Low Power Implementation a System Perspective," Website: http://cseweb.ucsd.edu/classess/wi10/cse241a, pp. 1-31.
"Advanced Compression With Oracle Database 11g," an Oracle White Paper, Jan. 2012, pp. 1-15.

* cited by examiner

NON-VOLATILE MEMORY SYSTEM, MEMORY CARD HAVING THE SAME, AND OPERATING METHOD OF NON-VOLATILE MEMORY SYSTEM

CROSS-REFERENCE TO RELATED APPLICATIONS

This U.S. non-provisional patent application claims priority under 35 U.S.C. § 119 from Korean Patent Application No. 10-2014-0047600, filed on Apr. 21, 2014, in the Korean Intellectual Property Office, and all the benefits accruing therefrom, the contents of which are herein incorporated by reference in their entirety.

BACKGROUND

Embodiments of the inventive concept are directed to a non-volatile memory system, and more particularly, to a non-volatile memory system capable of decreased power consumption, a memory card that includes the non-volatile memory system, and a method of operating the non-volatile memory system.

Among data storage devices, non-volatile memory devices retain stored data even when power supplied thereto is cut off. Examples of non-volatile memory devices include a read-only memory (ROM), a magnetic disc, an optical disc, a flash memory, a resistive random access memory (RRAM), a phase-change random access memory (PRAM), and a magnetic random-access memory (MRAM). A flash memory is a memory that stores data according to a change in a threshold voltage of a metal-oxide-semiconductor (MOS) transistor, and examples include a NAND flash memory and a NOR flash memory.

A typical mobile device stores instruction code or metadata in a static random access memory (SRAM), and during a sleep mode, current leakage occurs in the SRAM such that power consumption is increased. When the size of the instruction code or the size of the metadata is increased, the size of the SRAM has to be increased to correspond to the increase, which increases power consumption by the SRAM during the sleep mode.

A non-volatile memory system includes a memory device and a memory controller that controls the programming, reading, and erasing of data with respect to a cell array. A non-volatile memory system may be formed as a memory card to be embedded in a mobile device, and in this regard, there is a demand for decreasing the power consumed by the non-volatile memory system.

SUMMARY

Embodiments of the inventive concept may provide a non-volatile memory system capable of decreased power consumption, a memory card including the non-volatile memory system, and a method of operating the non-volatile memory system.

According to an aspect of the inventive concept, there is provided a non-volatile memory system including a memory controller that includes a first region that includes a first memory that stores compressed code, and a second region that includes a second memory that stores decompressed code, wherein power supplied to the first region and the second region is controlled according to an operation mode of the non-volatile memory system.

Each of the first memory and the second memory may be a random access memory (RAM).

The second region may further include a code compressor that compresses the decompressed code stored in the second memory, and a code decompressor that decompresses the compressed code stored in the first memory.

The first region may further include a central processing unit (CPU) that controls a compressed code storing operation performed by the first memory and a decompressed code storing operation performed by the second memory.

When the non-volatile memory system enters a sleep operation mode, power supplied to the first region may be maintained, and power supplied to the second region may be cut off.

The first memory may include a plurality of memory regions, power may be maintained to those first memory regions that store the compressed code, and power may be cut off to those first memory regions that do not store the compressed code.

When the non-volatile memory system enters a sleep operation mode, power supplied to the plurality of memory regions may be controlled based on compression information related to generation of the compressed code.

When the non-volatile memory system enters a sleep operation mode, the decompressed code stored in the second memory may be erased.

The first memory may be smaller than the second memory.

According to another aspect of the inventive concept, there is provided an method of operating a non-volatile memory system, the method including detecting a start of a first mode, compressing decompressed code stored in a second memory, and storing the compressed code in one or more memory regions of a first memory, cutting off power to the second memory, and maintaining power to the one or more memory regions of the first memory in which the compressed code is stored.

The method may further include detecting a start of a second mode, decompressing the compressed code stored in the one or more memory regions of the first memory, supplying power to the second memory, and storing the decompressed code in the second memory.

The non-volatile memory system may include a power on-domain and a power off-domain. Power may be maintained to the power on-domain and power may be cut off to the power off-domain during a sleep mode. The first memory may be disposed in the power on-domain, and the second memory may be disposed in the power off-domain.

The method may further include generating compression information about a result of compressing the decompressed code, where one or more memory regions of the first memory to which power is supplied may be selected based on the compression information.

According to another aspect of the inventive concept, there is provided a non-volatile memory system that includes a first memory configured to store compressed code, a second memory configured to store decompressed code, and a power on-domain and a power off-domain. Power is maintained to the power on-domain, power is cut off to the power off-domain during a sleep mode, the first memory is disposed in the power on-domain, and the second memory is disposed in the power off-domain.

The power on-domain may include a central processing unit (CPU) configured to control a compressed code storing operation performed by the first memory and a decompressed code storing operation performed by the second memory.

The power off-domain may include a code compressor configured to compress the decompressed code stored in the second memory, and a code decompressor configured to decompress the compressed code stored in the first memory.

The first memory may include a plurality of memory regions. Power can be maintained to those first memory regions that store the compressed code, and power is cut off to those first memory regions that do not store the compressed code.

DETAILED DESCRIPTION OF EXEMPLARY EMBODIMENTS

Figure 1:
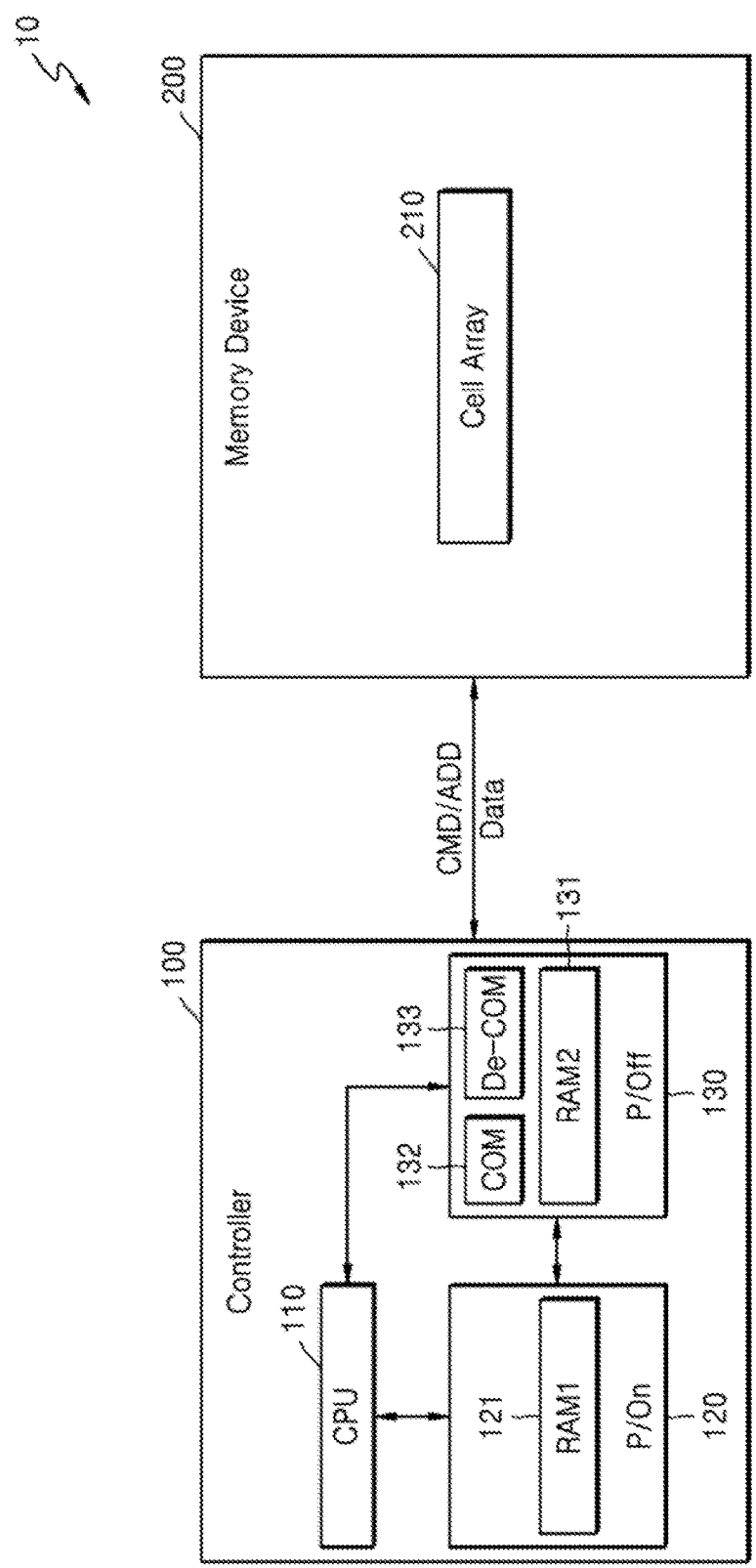
FIG. 1 is a block diagram of a non-volatile memory system, according to an embodiment of the inventive concept.

Embodiments of the inventive concept will now be described more fully with reference to the accompanying drawings, in which exemplary embodiments of the invention are shown. The invention may, however, be embodied in many different forms, and should not be construed as being limited to the embodiments set forth herein. Thus, the invention may include all revisions, equivalents, or substitutions which are included in the concept and the technical scope related to the invention. Like reference numerals in the drawings may denote like elements. In the drawings, the dimension of structures may be exaggerated for clarity.

FIG. 1 is a block diagram of a non-volatile memory system 10, according to an embodiment of the inventive concept. As illustrated in FIG. 1, the non-volatile memory system 10 may include a memory controller 100 and a non-volatile memory device 200. The memory controller 100 may receive a memory operation request by communicating with a host, and may provide a command CMD and an address ADD that corresponds to the memory operation to the non-volatile memory device 200. In response to the command CMD and the address ADD, the memory controller 100 may write data Data to the non-volatile memory device 200 or may read data Data from the non-volatile memory device 200. The non-volatile memory device 200 may include a cell array 210 that stores the data Data.

The non-volatile memory device 200 may retain stored data even when power supplied thereto is cut off. The cell array 210 may include a NAND or a NOR flash memory, a magnetic random-access memory (MRAM), a resistive random-access memory (RRAM), a ferroelectric random access memory (FRAM), a phase-change memory (PCM), etc. When the cell array 210 includes a NAND flash memory, the cell array 210 may include a plurality of blocks and pages, and data may be read in page units, whereas the data may be erased in block units.

The memory controller 100 may include a central processing unit (CPU) 110, a first region 120 including one or more circuit blocks, and a second region 130 including one or more circuit blocks. The first region 120 may have a region P/on to which power is supplied during a specific mode of the non-volatile memory system 10, and may include a first memory 121 that can store instruction codes that includes information related to operations of the non-volatile memory system 10, and can store data, such as firmware data or metadata, that is used for managing user data. In an embodiment of FIG. 1, the first memory 121 is implemented as a RAM RAM1.

The second region 130 may have a region P/off to which power supplied thereto during one mode of the non-volatile memory system 10 is cut off during the specific mode of the non-volatile memory system 10, and may include a second memory 131 that can store information, such as instruction codes, related to operations of the non-volatile memory system 10, or can store data, such as metadata, that is used in managing user data. In an embodiment of FIG. 1, the second memory 131 is implemented by a RAM RAM2. In a present embodiment, the instruction code or the metadata is stored in the first memory 121 and the second memory 131. However, embodiments of the inventive concept are not limited thereto. For example, other types of information besides user data may be defined as codes, and the first memory 121 and the second memory 131 may store these codes.

The memory controller 100 may further include a code compressor 132, hereinafter referred as the compressor 132 that compresses the instruction code or the metadata and thus generates compressed code, and a code decompressor 133, hereinafter referred as the decompressor 133, that decompresses compressed instruction code or compressed metadata and thus generates decompressed code. The compressor 132 and the decompressor 133 may be arranged in either the first region 120 or the second region 130. In an embodiment of FIG. 1, the compressor 132 and the decompressor 133 are arranged in the second region 130.

Codes that are compressed by the compressor 132 may be stored in the first memory 121 of the first region 120. Also, codes that are decompressed by the decompressor 133 may be stored in the second memory 131 of the second region 130. In a present embodiment, during a sleep mode of the non-volatile memory system 10, the compressed codes may be stored in the first region 120, but when the power supplied to the second region 130 is cut off, the decompressed codes that are stored in the second memory 131 may be erased.

For example, the non-volatile memory system 10 may determine whether sleep mode starts, based on a request from a host or a detection operation by the non-volatile memory system 10. During a normal operation of the non-volatile memory system 10, the non-volatile memory system 10 may operate by executing the decompressed codes that are stored in the second memory 131. When the start of sleep mode is detected, the decompressed codes that are stored in the second memory 131 are compressed by the compressor 132 under control of the CPU 110, to generate compressed codes. The compressed codes are stored in the first memory 121, and after sleep mode starts, power supplied to the first region 120 is maintained, whereas the power supplied to the second region 130 is cut off. Accordingly, the decompressed codes that are stored in the second memory 131 may be erased.

When the non-volatile memory system 10 returns to a normal mode from sleep mode, the compressed codes that are stored in the first memory 121 are transmitted to the decompressor 133 under control of the CPU 110, and the decompressor 133 generates decompressed codes. When normal mode starts, power is supplied to the second region 130. The decompressed codes may be stored in the second memory 131, and for normal operation, a program counter may refer to the second memory 131. The CPU 110 may execute the decompressed codes that are stored in the second memory 131 so that the non-volatile memory system 10 may operate.

According to a present embodiment, a sleep current drawn by the non-volatile memory system 10 when the non-volatile memory system 10 operates in sleep mode is reduced. Also, in an example where the non-volatile memory system 10 is embedded in a mobile device, power consumption by the non-volatile memory system 10 during sleep mode may be decreased.

In a present embodiment, a code compression technology is used so that the amount of RAM used to store the instruction code and the metadata during sleep mode may be decreased. As described above, the compressed codes may be stored in the first memory 121 during sleep mode, and the first memory 121 may be smaller than the second memory 131. That is, the first region 120 includes a minimum amount of RAM for storing compressed codes, and since the size of the first memory 121 of the first region 120, in which a power-on status is maintained during sleep mode, may be decreased, sleep current may be decreased, and thus power consumption may be decreased.

In an embodiment of FIG. 1, the CPU 110 is disposed outside the first region 120 and the second region 130, but embodiments of the inventive concept are not limited thereto. For example, if the CPU 110 is disposed in the first region 120, power may be applied to the CPU 110 during sleep mode. Alternatively, during another mode, such as a retention mode, other than sleep mode, normal power may be applied to the first region 120, whereas a power, such as a retention power less than the normal power, may be applied to the CPU 110.

In addition, the non-volatile memory system 10 of FIG. 1 may be formed as a memory card such as an embedded multimedia card (eMMC), a secure digital (SD) card, a micro SD card, etc.

Figure 2:
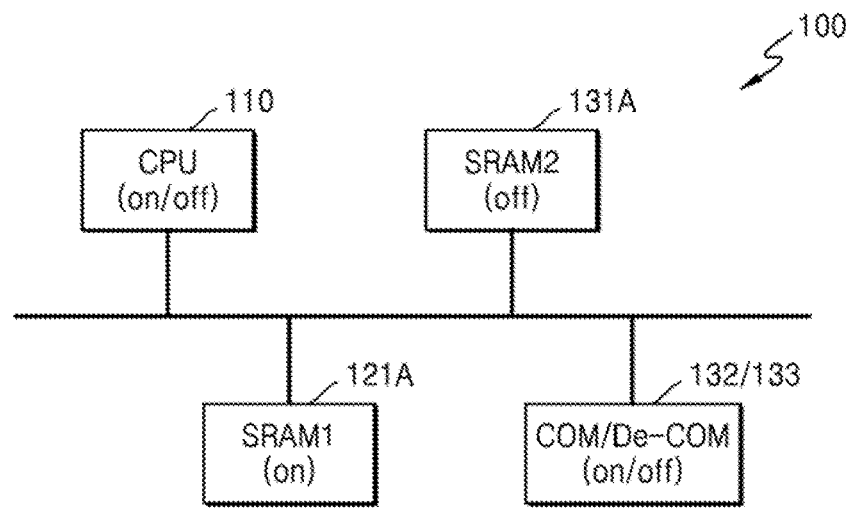
FIG. 2 is a block diagram of a memory controller of FIG. 1, according to an embodiment of the inventive concept.

FIG. 2 is a block diagram of the memory controller 100 of FIG. 1, according to an embodiment of the inventive concept.

As illustrated in FIG. 2, the memory controller 100 may include the CPU 110, a first memory 121A, a second memory 131A, and the compressor/decompressor 132 and 133. Each of the first memory 121A and the second memory 131A may be one of various types of memories, and for example, each of the first memory 121A and the second memory 131A may be a static random access memory (SRAM).

Each of function blocks shown in FIG. 2 may operate in a manner identical or similar to that described with reference to FIG. 1. That is, the CPU 110 may control operations of a non-volatile memory device by executing decompressed codes stored in the second memory 131A. In addition, the compressor/decompressor 132 and 133 may generate compressed codes to be stored in the first memory 121A, or may generate decompressed codes to be stored in the second memory 131A.

Each of the function blocks shown in FIG. 2 may operate in a power on-domain or a power off-domain. The power on-domain and the power off-domain may be variously defined. For example, the power on-domain may be defined as a region to which a power supply is maintained during sleep mode, and the power off-domain may be defined as a region to which power supplied thereto is cut during sleep mode.

As illustrated in FIG. 2, the CPU 110 may operate in the power on-domain or the power off-domain. Also, the compressor/decompressor 132 and 133 may operate in the power on-domain or the power off-domain. The first memory 121A may be a function block that operates in the power on-domain, may store compressed code generated by compressing instruction code and metadata, and may be relatively smaller than the second memory 131A. The second memory 131A may be a function block that operates in the power off-domain, may store decompressed code, and may be relatively larger than the first memory 121A. The first memory 121A may include a plurality of memory regions, only some of which may store the compressed code during sleep mode. In this case, although the first memory 121A operates in the power on-domain, power may be supplied to the memory regions which store the compressed code during sleep mode and power supplied to the remaining memory regions may be cut off.

Figure 3:
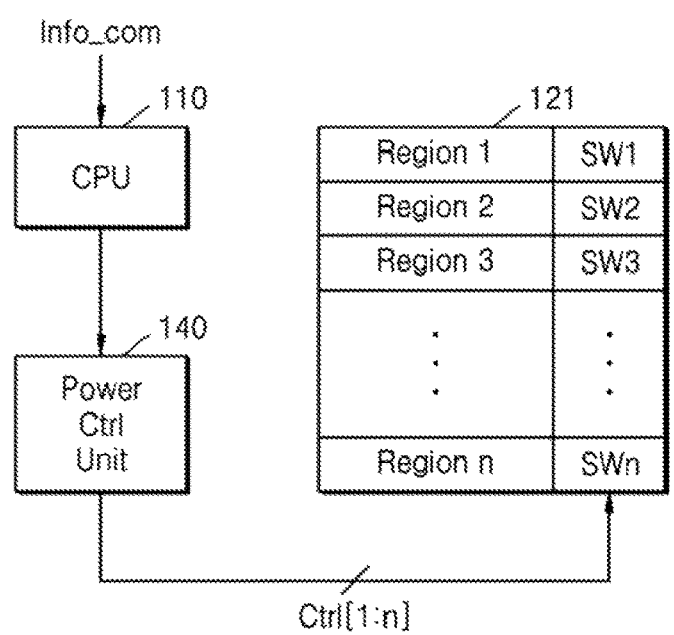
FIG. 3 illustrates an example where power supplied to a first memory of FIG. 1 is controlled, according to an embodiment of the inventive concept.

FIG. 3 illustrates an example where power supplied to the first memory 121 of FIG. 1 is controlled, according to an embodiment of the inventive concept. As illustrated in FIG. 3, the CPU 110 receives information Info_com related to code compression from the compressor/decompressor 132 and 133, and based on the information Info_com, the CPU 110 transmits a signal to the power control unit 140 to control the power supplied to the first memory 121 for each region.

The first memory 121 may include a plurality of memory regions, such as n memory regions Region 1 through Region n. Also, the first memory 121 may include n switches SW 1 through SW n that allow power to be supplied to the n memory regions Region 1 through Region n, respectively. The power control unit 140 may generate n control signals Ctrl[1:n] that control the n switches SW 1 through SW n.

Based on the size of compressed codes, only some of the n switches SW 1 through SW n may be turned on, so that power may be supplied only to memory regions that correspond to the turned-on switches. The codes that are compressed by the compressor/decompressor 132 and 133 may be stored in the memory regions to which power is supplied. Also, codes, such as system management code, that may be normally executable by the CPU 110 during sleep mode may be further stored in the memory regions, and an embodiment thereof will be described in detail below.

Figure 4:
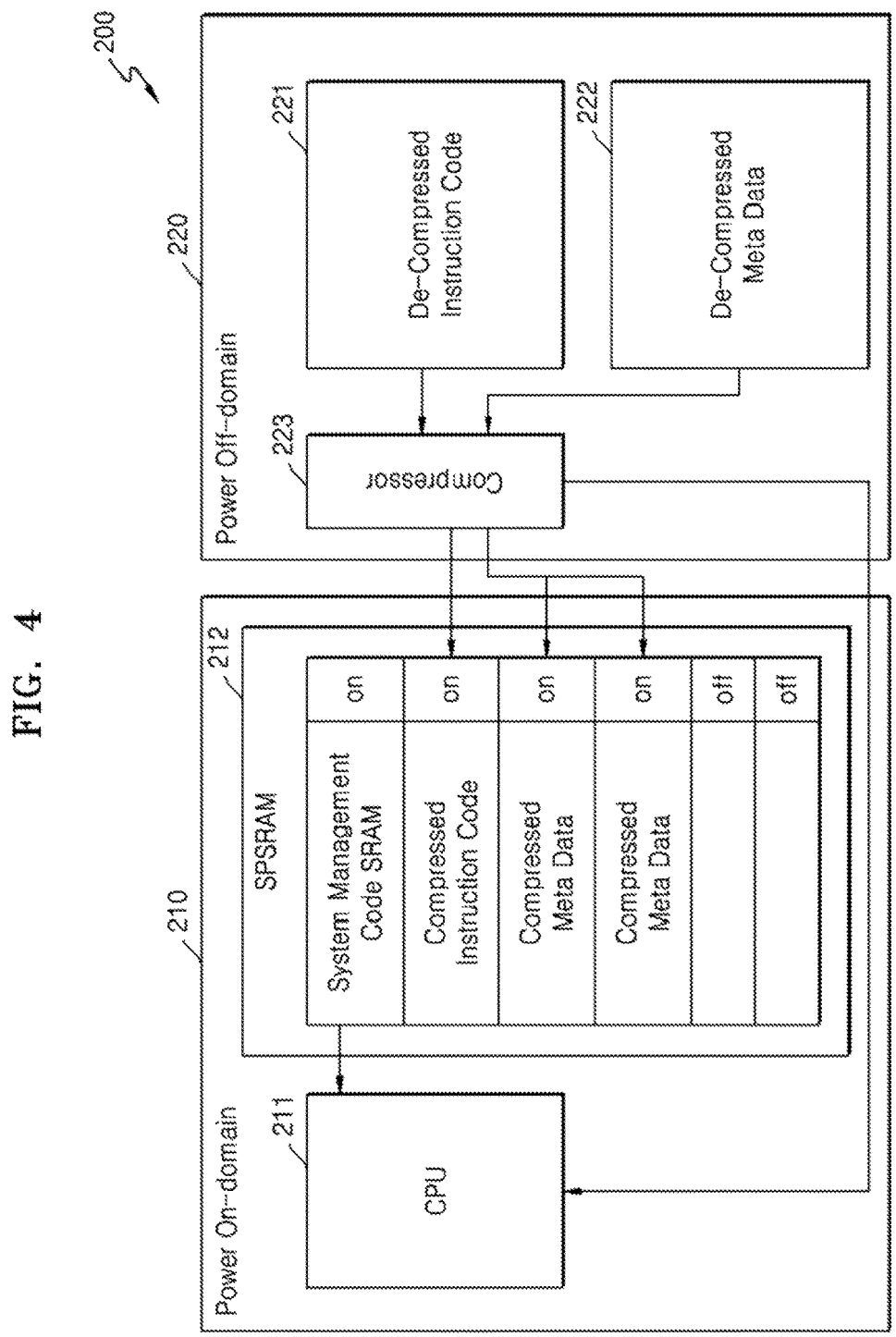
FIG. 4 is a block diagram of an example where compressed codes are stored when sleep mode starts, according to an embodiment of the inventive concept.

FIG. 4 is a block diagram of an example where compressed codes are stored when sleep mode starts, according to an embodiment of the inventive concept.

As illustrated in FIG. 4, a memory controller 200 may include a first region 210 as a power on-domain, and a second region 220 as a power off-domain. The first region 210 includes a CPU 211 and a first memory 212, and in an embodiment of FIG. 4, the first memory 212 may be a single port SRAM SPSRAM. The second region 220 includes second memories 221 and 222, and a compressor 223, and in an embodiment of FIG. 4, the second memories 221 and 222 include a first memory region 221 that stores decompressed instruction code, and a second memory region 222 that stores decompressed metadata.

Under normal operation, a program counter refers to the second memories 221 and 222 so that codes are executed and memory operation is controlled, and when a start of sleep mode is detected, the codes are compressed under control of the CPU 211. For example, the first memory 212 may include a memory region that stores system management code, a memory region that stores compressed instruction code, and a memory region that stores compressed metadata. The system management code may correspond to general decompressed codes, and may include power management code for managing power of the non-volatile memory system 10. That is, in a previous embodiment, the first memory 212 stores compressed codes. However, embodiments of the inventive concept are not limited thereto, and thus the first memory 212 may further include a memory region that stores both compressed code and uncompressed normal code.

When the start of sleep mode is detected, the CPU 211 may execute the system management code, and under control of the system management code, the CPU 211 may proceed with compressing the decompressed codes and storing the codes in the second memories 221 and 222 of the second region 220. Under control of the CPU 211, the decompressed codes stored in the second memories 221 and 222 are provided to the compressor 223, and the compressor 223 generates compressed codes by performing compression, and outputs the compressed codes to the first region 210. Also, the compressor 223 may output at least one piece of information related to a result of the compression, such as a compression rate, a compressed code size, etc., to the CPU 211.

The compressed codes are stored in the first memory 212. For example, compressed instruction code and compressed metadata may be stored in the first memory 212. The size of the instruction code may be preset, but the size of metadata may vary based on a system operation state. Also, when compressed codes are generated at a preset compression rate, a size of the compressed instruction code may have a preset value, but a size of the compressed metadata may vary. The compressed instruction code may be stored in an area, such as a first memory region, of the first memory 212, and the compressed metadata may be stored in another area, such as a second memory region, of the first memory 212.

The first memory 212 may include a unit that controls whether to supply power to each of memory regions. For example, as in a previous embodiment, the first memory 212 may include switch units that control whether to supply power to the respective memory regions, in response to a predetermined control signal. The CPU 211 may select memory regions to which the power is supplied, and memory regions to which the power is cut off, based on the compression information, and may control power supplied to the memory regions. Accordingly, power may be supplied to memory regions where the compressed instruction code and the compressed metadata are stored, and the power may be cut off to the memory regions where no compressed instruction code and compressed metadata are stored. When the storing of the compressed codes is complete, the non-volatile memory system 10 may enter into sleep mode.

Figure 5:
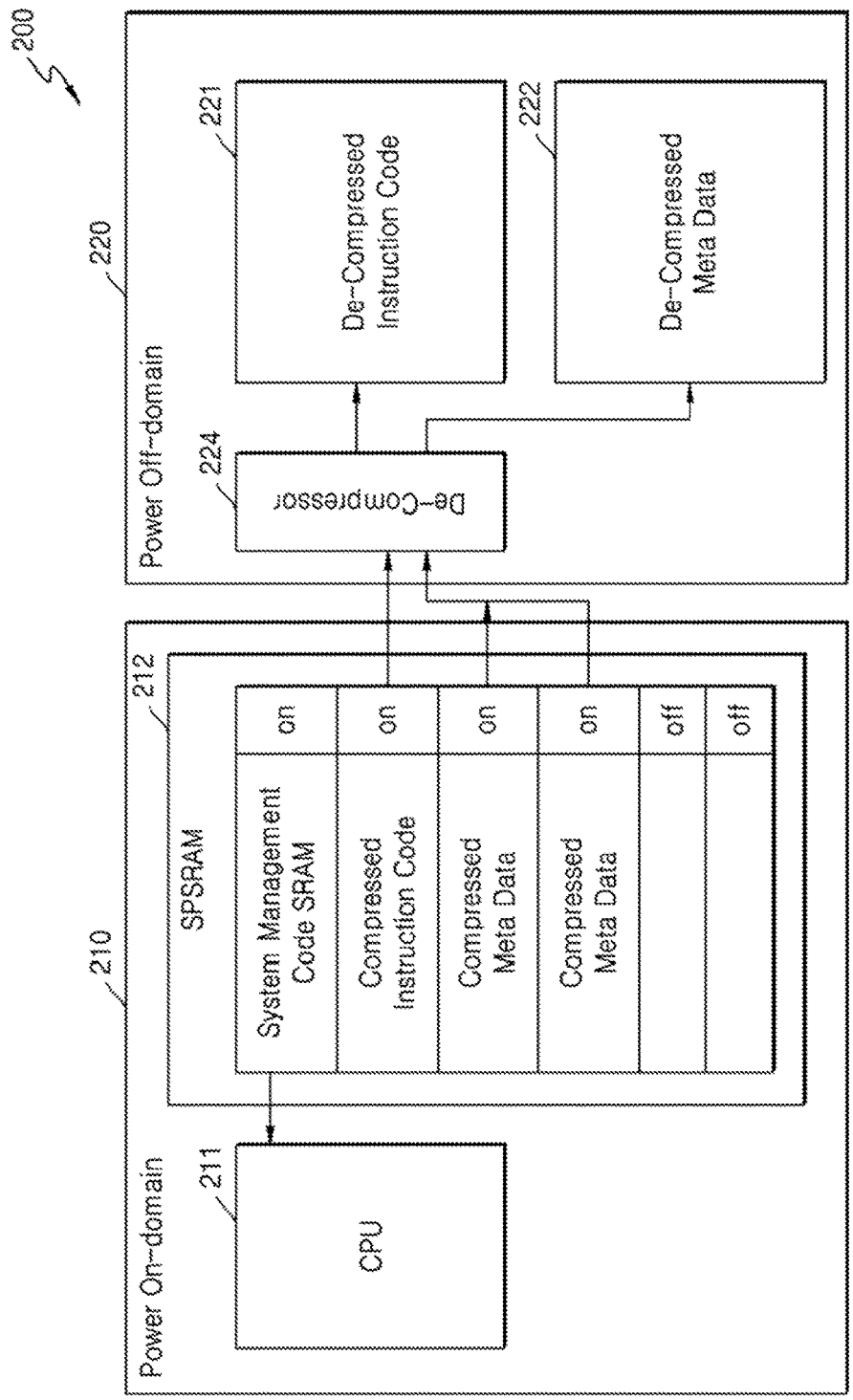
FIG. 5 is a block diagram of an example where decompressed codes are stored when sleep mode ends, according to an embodiment of the inventive concept.

FIG. 5 is a block diagram of an example where decompressed codes are stored when sleep mode ends, according to an embodiment of the inventive concept.

As illustrated in FIG. 5, the memory controller 200 may include the first region 210 as a power on-domain, and the second region 220 as a power off-domain. The first region 210 may include the CPU 211 and the first memory 212, and the second region 220 may include the second memories 221 and 222, and a de-compressor 224, and in an embodiment of FIG. 5, the first memory region 221 stores decompressed instruction code, and the second memory region 222 stores decompressed metadata.

When a wake-up signal for terminating sleep mode is detected, a program counter refers to a memory region that stores system management code of the first memory 212. The CPU 211 may execute the system management code, and thus may control the decompressing of compressed codes, and the storing of decompressed codes in the second memories 221 and 222.

The compressed instruction code and the compressed metadata that are stored in the first memory region 212 may be provided to the decompressor 224 of the second region 220. The decompressor 224 may generate decompressed instruction code and decompressed metadata by performing decompression. The decompressed instruction code may be stored in the first memory region 221, and the decompressed metadata may be stored in the second memory region 222. Afterward, the program counter may refer to the first and second memories 221 and 222 of the second region 220 where the decompressed codes are stored.

When sleep mode ends, or normal mode starts, power may be supplied to the second region 220, which is the power off-domain. The CPU 211 may perform a memory operation by executing code stored in the second memories 221 and 222. Here, the compressed codes that are stored in the first memory 212 may or may not be erased. Also, during normal mode, power supplied to some memory regions of the first memory 212, such as memory regions where no compressed codes are stored, may be maintained or cut off based on a power switching operation.

In addition, the system management code may be executed during normal mode. In this case, the system management code may be stored and executed in the first memory 212 or may be stored and executed in the second memories 221 and 222. Accordingly, when normal mode starts, compressed codes, such as the compressed instruction code and the compressed metadata, may be decompressed and stored in the second memories 221 and 222, and the system management code may also be stored in the second memories 221 and 222.

Figure 6:
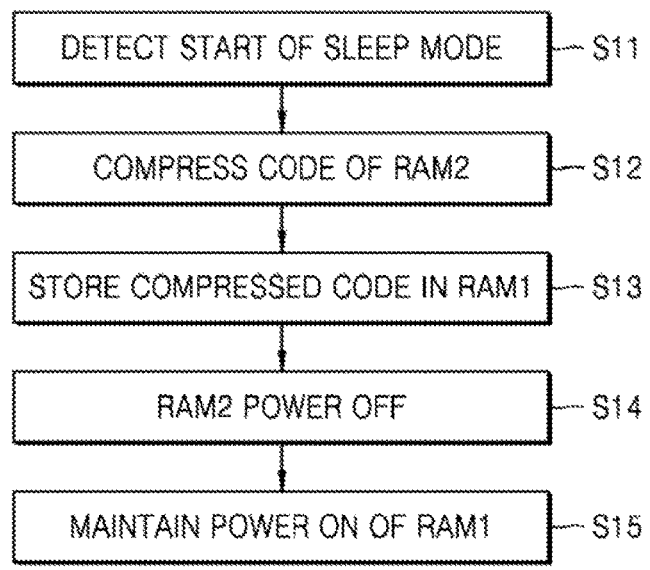
FIG. 6 is a flowchart of a method of operating a non-volatile memory system, according to an embodiment of the inventive concept.

FIG. 6 is a flowchart of a method of operating a non-volatile memory system, according to an embodiment of the inventive concept. In an embodiment of FIG. 6, codes are stored when sleep mode starts.

As illustrated in FIG. 6, the start of sleep mode may be detected based on a command from a host or by an operation of the non-volatile memory system (operation S11). The non-volatile memory system includes a memory controller that includes a power on-domain to which power is supplied during sleep mode, and a power off-domain to which no power is supplied during sleep mode. Also, each of the power on-domain and the power off-domain includes one or more circuit blocks. For example, the power on-domain may include a first memory, such as a RAM 1, and the power off-domain may include a second memory, such as a RAM 2.

When the start of sleep mode is detected, a compression is performed with respect to decompressed codes that are stored in the second memory RAM 2 of the power off-domain (operation S12). Compressed codes that are generated in operation S12 are stored in at least one memory region of the first memory RAM 1 of the power on-domain (operation S13).

When sleep mode starts, power supplied to the power off-domain is cut off so that no power is supplied to the second memory RAM 2 (operation S14). Accordingly, the decompressed codes that are stored in the second memory RAM 2 may be erased. Also, when sleep mode starts, power supplied to the power on-domain is maintained, so that power may be supplied to the first memory RAM 1 (operation S15). In a present embodiment, the first memory RAM 1 may include a plurality of memory regions, and switches that respectively correspond to the plurality of memory regions that may switch a power supply. With respect to the power supplied to the first memory RAM 1, power may be supplied to those memory regions where compressed codes are stored, and no power may be supplied to the remaining memory regions, based on switching operations of the switches.

Figure 7:
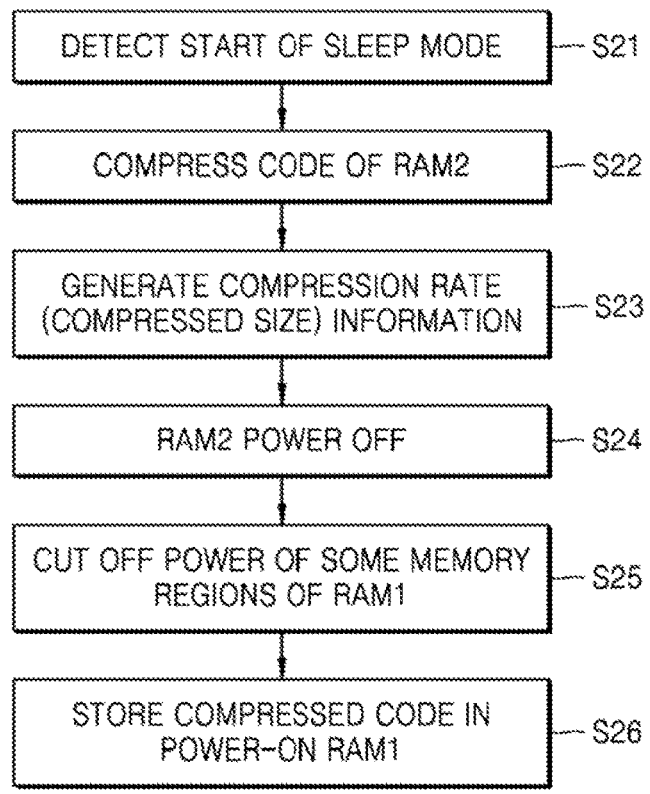
FIG. 7 is a flowchart of a method of operating a non-volatile memory system, according to another embodiment of the inventive concept.

FIG. 7 is a flowchart of a method of operating a non-volatile memory system, according to another embodiment of the inventive concept. In the embodiment of FIG. 7, codes are stored when sleep mode starts.

As illustrated in FIG. 7, the start of sleep mode may be detected based on a command from a host or by an operation of the non-volatile memory system (operation S21). When the start of sleep mode is detected, a compression is performed with respect to decompressed codes that are stored in a second memory RAM 2 of a power off-domain (operation S22). The compression may be performed by a compressor in a memory controller, and the compressor may generate at least one piece of information related to a result of the compression, such as a compression rate, a compressed code size, etc. (operation S23).

When sleep mode starts, power supplied to the power off-domain is cut off so that no power is supplied to the second memory RAM 2 (operation S24). Accordingly, the decompressed codes that are stored in the second memory RAM 2 may be erased. In addition, a first memory RAM 1 may include a plurality of memory regions, and the size of the first memory RAM 1 to store the compressed instruction code and compressed metadata may be determined based on the compression information generated by the compression. As the result of the compression, power is maintained to some memory regions of the first memory RAM 1, and power is cut off to the remaining memory regions of the first memory RAM 1 (operation S25). The compression codes are stored in the memory regions of the first memory RAM 1 to which power is maintained (operation S26).

Figure 8:
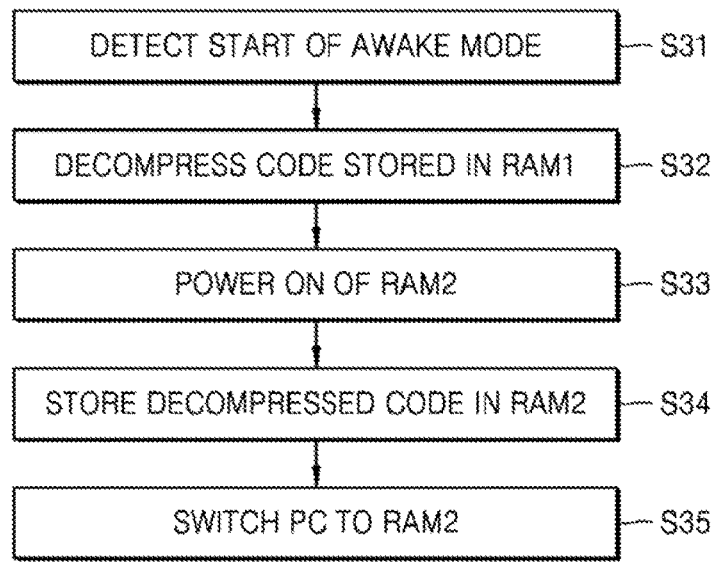
FIG. 8 is a flowchart of a method of operating a non-volatile memory system, according to another embodiment of the inventive concept.

FIG. 8 is a flowchart of a method of operating a non-volatile memory system, according to another embodiment of the inventive concept. In the embodiment of FIG. 8, codes are stored when sleep mode ends.

As illustrated in FIG. 8, the end of sleep mode or the start of normal mode may be detected based on a command from a host or by an operation of the non-volatile memory system (operation S31). When the end of sleep mode is detected, a decompression is performed with respect to compressed codes that are stored in a first memory RAM 1 of a power on-domain (operation S32). For example, since the compressed codes are decompressed by a decompressor in a memory controller, decompressed codes are generated.

In addition, when the end of sleep mode is detected, power is supplied to a power off-domain to supply power to a second memory RAM 2 (operation S33). The decompressed codes are stored in the second memory RAM 2 (operation S34). In addition, a program counter switches to refers to the second memory RAM 2 (operation S35), so that the decompressed codes that are stored in the second memory RAM 2 may be executed by a CPU to control memory operations.

As in a previous embodiment, during normal mode, power is maintained to the power on-domain so that power may be supplied to the first memory RAM 1. The first memory RAM 1 may include a plurality of memory regions, and in this regard, power may be maintained to those memory regions where the compressed codes are stored, and power may be cut off to the remaining memory regions where no compressed codes are stored. In a present embodiment, when a normal operation is performed, the compressed codes do not need to be stored, and thus may be erased by cutting off power to the first memory RAM 1. In a present embodiment, as in a previous embodiment, system management code for managing the non-volatile memory system may be stored in the first memory RAM 1. The system management code may be a normal code executed to control system management. That is, the first memory RAM 1 may further include system management code as well as the compressed codes, and although power is cut off to the first memory RAM 1 during normal mode, power is maintained to a memory region of the first memory RAM 1 where the system management code is stored.

Figure 9:
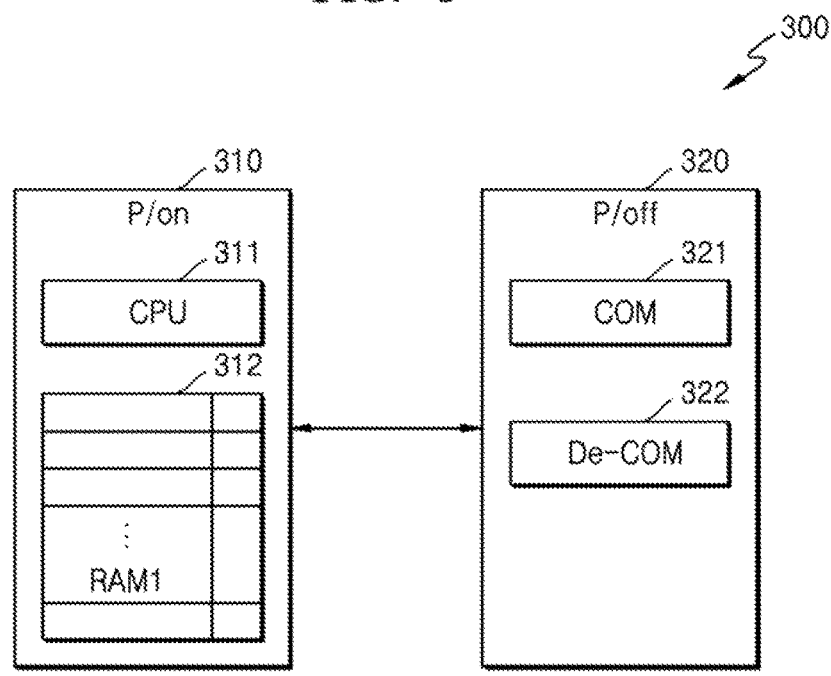
FIG. 9 is a block diagram of a non-volatile memory system, according to another embodiment of the inventive concept.

FIG. 9 is a block diagram of a non-volatile memory system 300, according to another embodiment of the inventive concept. In the embodiment of FIG. 9, compressed code and decompressed code are all stored in a memory RAM 1 of a power on-domain.

As illustrated in FIG. 9, the non-volatile memory system 300 may include a memory controller that may include a first region 310 as a power on-domain, and a second region 320 as a power off-domain. The first region 310 may include a CPU 311 and a memory 312, and the memory 312 may include various types of volatile memories that store information. As in previous embodiments, the memory 312 may include an SRAM RAM 1.

The second region 320 may include one or more function blocks, and in the embodiment of FIG. 9, the second region 320 may include the compressor 321 and decompressor 322. However, embodiments of the inventive concept are not limited thereto, and thus the compressor 321 and decompressor 322 may be included in the first region 310, and the second region 320 may include other function blocks in addition to the compressor 321 and decompressor 322.

Figure 10:
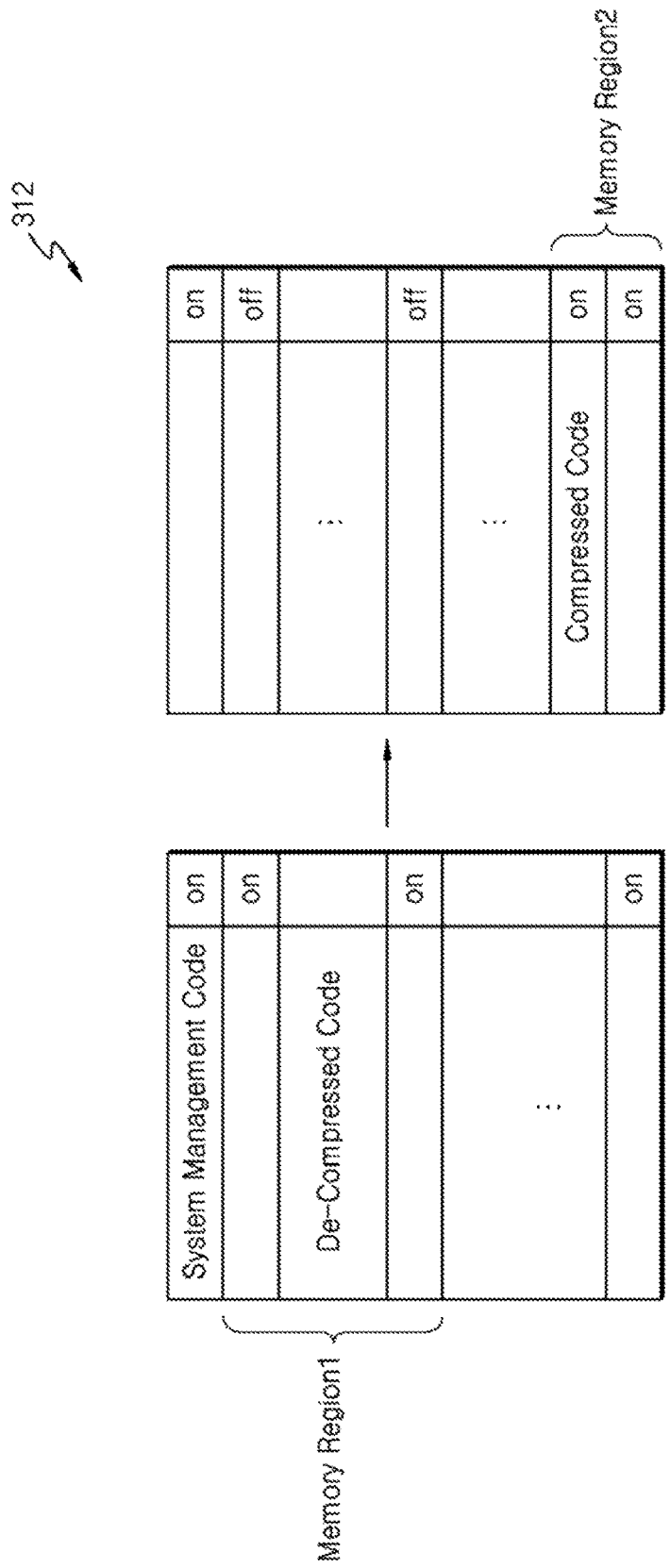
FIG. 10 illustrates an example of a memory operation of FIG. 9.
Figure 11:
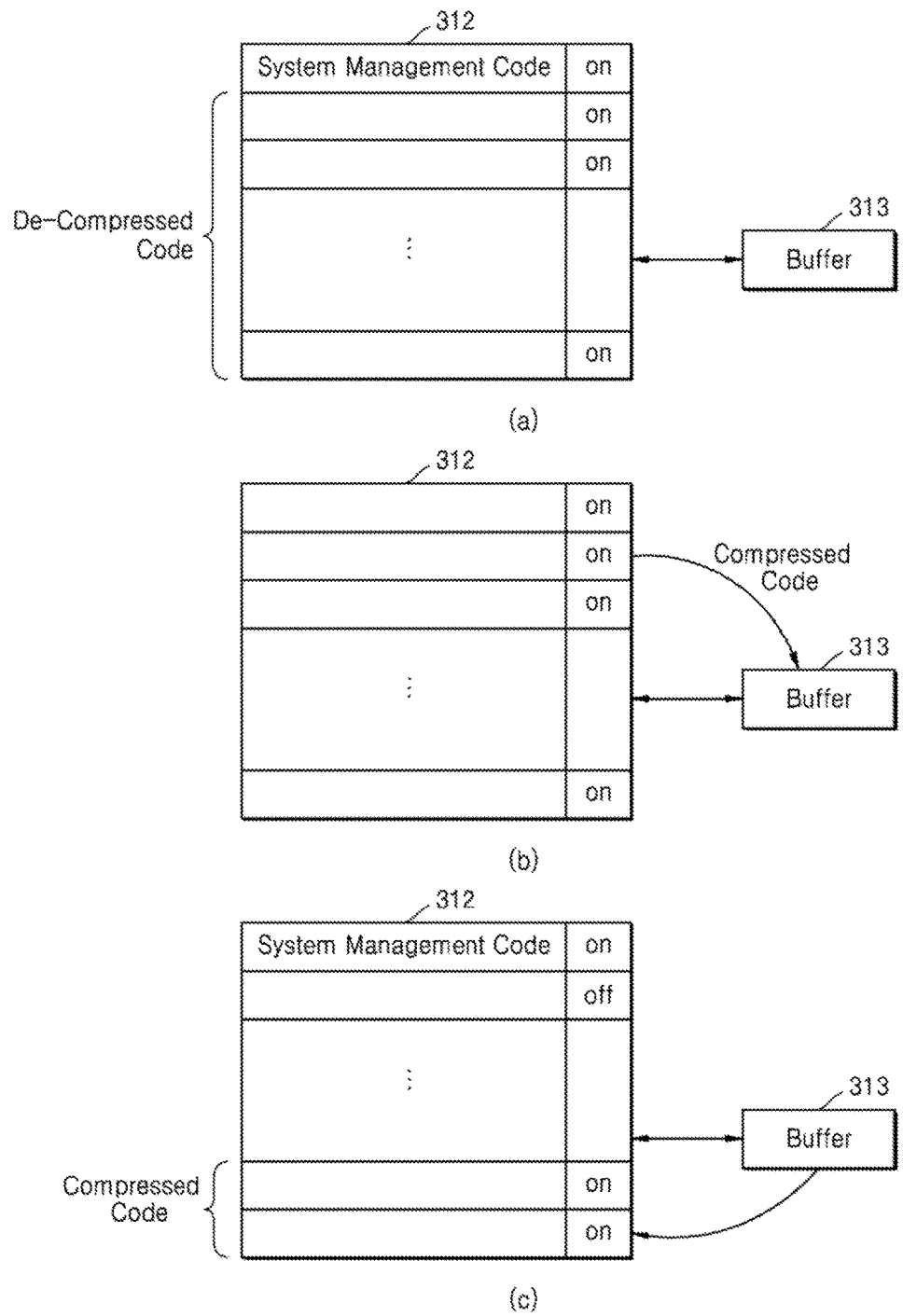
FIG. 11 illustrates another example of a memory operation of FIG. 9.

Examples of an operation of the memory controller shown in FIG. 9 are described with reference to FIGS. 10 and 11. FIG. 10 illustrates an example of a memory operation of FIG. 9, and FIG. 11 illustrates another example of a memory operation of FIG. 9.

As illustrated in FIG. 10, the memory 312 may include a plurality of memory regions, and during normal mode, the memory 312 may store system management code and decompressed codes such as decompressed instruction code and decompressed metadata. In addition, to control power supplied to each of the plurality of memory regions, the memory 312 may include switches. For a memory operation, the memory 312 may store the decompressed instruction code and the decompressed metadata, and the CPU 110 may execute the decompressed codes to control the memory operation. In addition, as in a previous embodiment, the system management code may also be stored in the memory 312. A memory region where the decompressed code is stored during normal mode may be referred as a first memory region.

When a start of sleep mode is detected, compressed code may be generated with respect to at least one code. For example, compressed code that includes instruction code and metadata may be generated by the compressor 321 in the memory controller. The compressed code may be stored in a second memory region of the memory 312. During sleep mode, power may be cut off to the first memory region of the memory 312. In the embodiment of FIG. 10, the power is cut off to the first memory region that stores decompressed codes to erase the decompressed codes. That is, during sleep mode, power may be selectively maintained to a memory region of memory 312 that stores the system management code and memory regions of memory 312 that store compressed codes.

According to embodiments, the amount of a RAM to which power is actually supplied during sleep mode may be minimized, thereby reducing a sleep current to the RAM.

Referring now to FIG. 11, a buffer 313 may be further used to store the compressed code or the decompressed code. For example, as illustrated in FIG. 11(a), the memory 312 may be large enough to store the system management code and the decompressed code, so that that memory 312 may store the system management code and the decompressed code during normal mode.

When the start of sleep mode is detected, a compression is performed on the instruction code and metadata to generate compressed codes. As illustrated in FIG. 11(b), the generated compressed codes may be temporarily stored in the buffer 313. Afterward, as illustrated in FIG. 11(c), power is maintained to the memory region of the memory 312 that stores the system management code, and also, power is maintained to the memory regions of the memory 312 that are large enough to store the compressed code. On the other hand, power may be cut off to the remaining memory regions of the memory 312.

The compressed codes are output to and stored in the memory regions to which the power supply is maintained. Thus, during sleep mode, the memory 312 may store the system management code and the compressed code. In the embodiment of FIG. 11, the memory regions that store the compressed codes are not separated from the memory regions that store the decompressed codes, so that power consumption by the memory 312 may be decreased, and the size of the memory 312 may be decreased.

Figure 12:
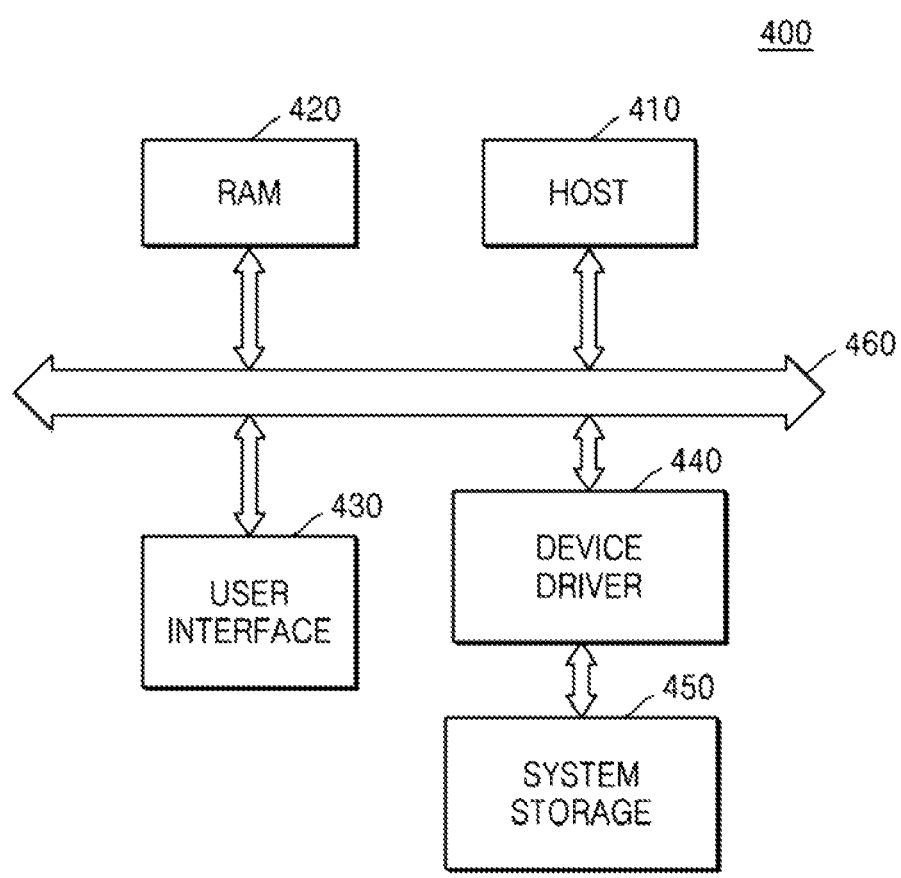
FIG. 12 is a block diagram of a computing system including a non-volatile memory system according to an embodiment of the inventive concept.

FIG. 12 is a block diagram of a computing system 400 that includes a non-volatile memory system according to an embodiment of the inventive concept. The computing system 400 may be, for example, a mobile apparatus or a desktop computer, and a non-volatile memory system according to embodiments of the inventive concept may be embodied as a non-volatile storage system 450.

In the present embodiment, the computing system 400 may include a host 410 that includes a CPU, etc., RAM 420, a user interface 430, and a device driver 440 for controlling an operation and management of the non-volatile storage system 450. Each of the aforementioned elements is electrically connected to a bus 460. The non-volatile storage system 450 may be connected to the device driver 440. The host 410 may control the computing system 400 and may perform calculations that correspond to user input received via the user interface 430. The RAM 420 may be a data memory of the host 410, and the host 410 may write or read user data to or from the non-volatile storage system 450 via the device driver 440. In the embodiment of FIG. 12, the device driver 440 is outside the host 410. However, the device driver 440 may be part of the host 410.

As in aforementioned embodiments, the non-volatile storage system 450 may include a memory controller that includes a power on-domain and a power off-domain. Each of the power on-domain and the power off-domain may be a memory that includes an SRAM, etc., and during sleep mode, a first memory of the power on-domain may store compressed codes, and power is cut off to the power off-domain. The first memory may further store system management code as normal code that is executable by a CPU. During normal mode, power is supplied to the power on-domain and the power off-domain, and a second memory of the power off-domain stores decompressed code. The CPU may access the second memory and thus may control a memory operation. In addition, during normal mode, power may be cut off to the first memory while power may be maintained to a memory region of the first memory that stores the system management code, or power may be maintained to the first memory.

Figure 13:
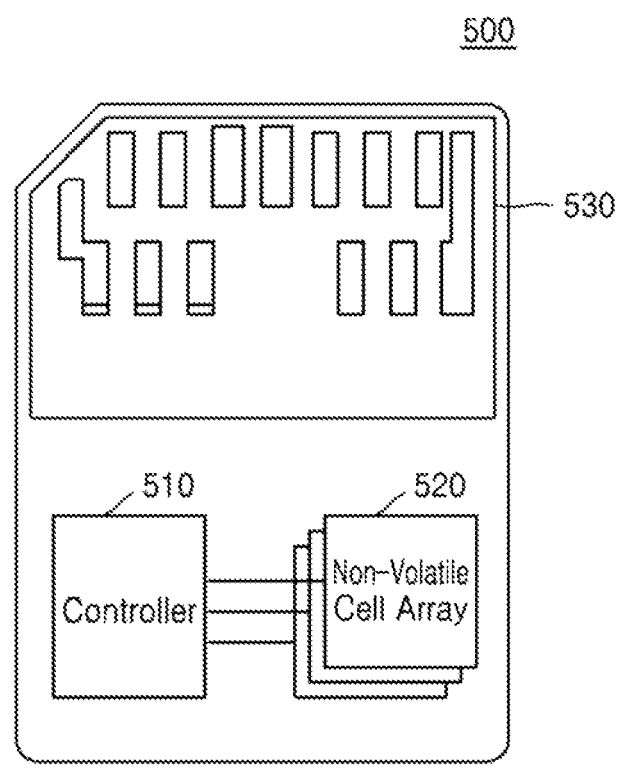
FIG. 13 illustrates a memory card according to an embodiment of the inventive concept.

FIG. 13 illustrates a memory card 500 according to an embodiment of the inventive concept. The memory card 500 may function as a portable storage device that is connected to an electronic apparatus such as a mobile apparatus or a desktop computer. As illustrated in FIG. 13, the memory card 500 may include a controller 510, a non-volatile cell array 520, and a port area 530.

The memory card 500 may communicate with an external host via the port area 530, and the controller 510 may control the non-volatile cell array 520. The controller 510 may perform an operation by executing a program read from a ROM that stores the program. The controller 510 may manage the operation of the non-volatile memory system according to embodiments of the inventive concept. The non-volatile cell array 520 may include a cell array such as a NAND flash memory, a NOR flash memory, etc.

As in aforementioned embodiments, the memory controller 510 may include a power on-domain and a power off-domain. During sleep mode, a first memory of the power on-domain may store compressed code, and during normal mode, a second memory of the power off-domain may store decompressed code.

Figure 14:
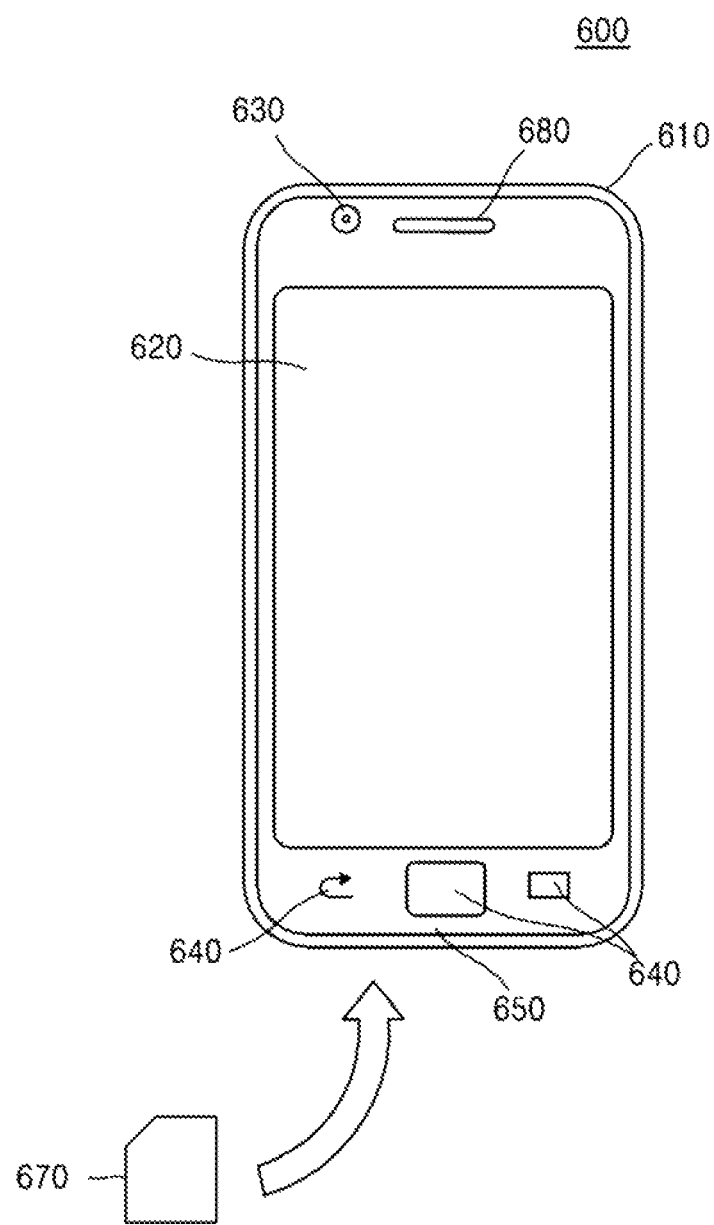
FIG. 14 is a diagram of a mobile terminal having a host and a non-volatile memory system embodied therein, according to an embodiment of the inventive concept.

FIG. 14 is a diagram of a mobile terminal 600 having a host and a non-volatile memory system embodied therein, according to an embodiment of the inventive concept. The mobile terminal 600 may be a smartphone whose functions can change or be extended using application programs. The mobile terminal 600 includes an embedded antenna 610 for exchanging a radio frequency (RF) signal with a wireless base station, a camera 630 for capturing video and still images, and also includes a display screen 620 such as a liquid crystal display (LCD) screen, an organic light-emitting diode (OLED) screen, etc. for displaying images that are captured by the camera 630 or received from the antenna 610. The mobile terminal 600 may include an operation panel 640 that includes a control button and a touch panel. If the display screen 620 is a touch screen, the operation panel 640 may further include the display screen 620 touch panel. The mobile terminal 600 may include a sound output unit or speaker 680 that outputs voice and sound, and a sound input unit or microphone 650 that receives voice and sound. The camera 630 may be a charge coupled device (CCD) camera for capturing video and still images. In addition, the mobile terminal 600 may include a storage medium 670 that can store encoded or decoded data, such as video or still images captured by the camera 630, received via an e-mail, or obtained in another way, and a slot for mounting the storage medium 670 into the mobile terminal 600. The storage medium 670 may be a non-volatile memory system as in aforementioned embodiments, and may be a flash memory such as an SD card or an electrically erasable and programmable read only memory (EEPROM) embedded in a plastic case.

While embodiments of the inventive concept has been particularly shown and described with reference to exemplary embodiments thereof, it will be understood that various changes in form and details may be made therein without departing from the spirit and scope of the following claims.

What is claimed is:

1. A memory controller for a non-volatile memory system comprising:
   a first power region that includes a first memory that stores compressed code wherein data stored in the first memory corresponds to instruction code or metadata related to an operation of the nonvolatile memory; and
   a second power region that includes a second memory that stores decompressed code,
   wherein the memory controller controls compression of a program stored in its first memory and executes a program stored in the first memory or a program stored in the second memory based on a mode of operation,
   wherein power supplied to the first power region and the second power region is controlled according to an operation mode of the non-volatile memory system, wherein power is not supplied to the first power region in a normal mode of operation,
   wherein the first power region includes a plurality of regions and some of the plurality of regions are selectively placed in a power-on state based on compression information of the instruction code or the metadata generated by a compression operation,
   wherein, when a wake-up signal for terminating a sleep mode is detected, the controller executes system management program code stored in the first memory in which a power-on state is maintained in sleep mode according to a program counter pointing to the first memory for controlling the decompressing of the compressed code, and in the normal mode, the execution operation is performed according to the program counter pointing to the second memory.

2. The non-volatile memory system of claim 1, wherein each of the first memory and the second memory is a random access memory (RAM).

3. The non-volatile memory system of claim 1, wherein the second region further comprises:
   a code compressor that compresses the decompressed code stored in the second memory; and
   a code decompressor that decompresses the compressed code stored in the first memory.

4. The non-volatile memory system of claim 1, wherein the first region further comprises a central processing unit (CPU) that controls a compressed code storing operation performed by the first memory and a decompressed code storing operation performed by the second memory.

5. The non-volatile memory system of claim 1, wherein, when the non-volatile memory system enters sleep mode, power supplied to the first region is maintained, power supplied to the second region is cut off, and the decompressed code stored in the second memory is erased.

6. The non-volatile memory system of claim 1, wherein some memory regions of the first memory store the compressed code,
   wherein power is maintained to memory regions of the first memory that store the compressed code, and
   wherein power is cut off to memory regions of the first memory that do not store the compressed code.

7. The non-volatile memory system of claim 6, wherein, when the non-volatile memory system enters sleep mode, power supplied to the plurality of memory regions is controlled based on compression information related to generation of the compressed code.

8. The non-volatile memory system of claim 1, wherein the first memory is smaller than the second memory.

9. The non-volatile memory system of claim 1, further comprising a memory device that comprises a non-volatile memory cell array.

10. A method of operating a non-volatile memory system, the method comprising:
    detecting a start of a sleep mode;
    compressing decompressed code stored in a second memory of a second power domain, and storing the compressed code in one or more memory regions of a first memory of a first power domain, wherein data stored in the first memory corresponds to instruction code or metadata related to an operation of the non-volatile memory;
    cutting off power to the second memory; and
    maintaining power to the one or more memory regions of the first memory in which the compressed code is stored,
    wherein the first memory includes a plurality of regions, and some of the plurality of regions are selectively placed in a power-on state based on compression information of the instruction code or the metadata generated by a compression operation,
    wherein, when a wake-up signal for terminating the sleep mode is detected, the controller executes system management program code stored in the first memory in which a power-on state is maintained in sleep mode according to a program counter pointing to the first memory for controlling the decompressing of the compressed code, and in a normal mode, the execution operation is performed according to the program counter pointing to the second memory, and power is not supplied to the first power domain.

11. The method of claim 10, further comprising:
    detecting a start of the second mode;
    decompressing the compressed code stored in the one or more memory regions of the first memory;
    supplying power to the second memory; and
    storing the decompressed code in the second memory.

12. The method of claim 10,
    wherein power is maintained to the power on-domain and power is cut off to the power off-domain during the first mode.

13. The method of claim 10, further comprising generating compression information about a result of compressing the decompressed code, wherein one or more memory regions of the first memory to which power is supplied are selected based on the compression information.

14. A memory controller for a non-volatile memory system comprising:
a power on-domain and a power off-domain;
a first memory disposed in the power-on domain that stores compressed code, wherein data stored in the first memory corresponds to instruction code or metadata related to an operation of the nonvolatile memory;
a second memory disposed in the power-off domain that stores decompressed code; and
wherein the memory controller controls a compression of a program stored in its first memory and executes a program stored in the first memory or a program stored in the second memory based on a mode of operation,
wherein power is maintained to the power on-domain and power is cut off to the power off-domain during a sleep mode, and
wherein the first memory includes a plurality of regions, and some of the plurality of regions are selectively placed in a power-on state based on compression information of the instruction code or the metadata generated by a compression operation,
wherein, when a wake-up signal for terminating a sleep mode is detected, the controller executes system management program code stored in the first memory in which a power-on state is maintained in sleep mode according to a program counter pointing to the first memory for controlling the decompressing of the compressed code, and in the normal mode, the execution operation is performed according to the program counter pointing to the second memory, and power is not supplied to the first power domain.

15. The non-volatile memory system of claim 14, wherein the power on-domain comprises a central processing unit (CPU) that controls a compressed code storing operation performed by the first memory and a decompressed code storing operation performed by the second memory.

16. The non-volatile memory system of claim 14, wherein the power off-domain comprises:
a code compressor that compresses the decompressed code stored in the second memory; and
a code decompressor that decompresses the compressed code stored in the first memory.

17. The non-volatile memory system of claim 14,
wherein some memory regions of the first memory store the compressed code,
wherein power is maintained to memory regions of the first memory that store the compressed code, and
wherein power is cut off to memory regions of the first memory that do not store the compressed code.

* * * * *